US005629418A

United States Patent [19]

Molaire et al.

[11] Patent Number: 5,629,418
[45] Date of Patent: May 13, 1997

[54] PREPARATION OF TITANYL FLUOROPHTHALOCYANINES

[75] Inventors: Michel F. Molaire; Jeanne E. Kaeding; William T. Gruenbaum, all of Rochester, N.Y.

[73] Assignee: Eastman Kodak Company, Rochester, N.Y.

[21] Appl. No.: 330,396

[22] Filed: Oct. 27, 1994

[51] Int. Cl.[6] ................................. C09B 67/50
[52] U.S. Cl. ................ 540/141; 540/122; 540/136; 540/139; 540/140
[58] Field of Search ...................... 540/141, 136

[56] References Cited

U.S. PATENT DOCUMENTS

| | | | |
|---|---|---|---|
| 3,615,414 | 10/1971 | Light | 96/1.6 |
| 4,175,960 | 11/1979 | Berwick et al. | 430/58 |
| 4,514,481 | 4/1985 | Scozzafava et al. | 430/58 |
| 4,578,334 | 3/1986 | Borsenberger et al. | 430/58 |
| 4,666,802 | 5/1987 | Hung et al. | 430/58 |
| 4,701,396 | 10/1987 | Hung et al. | 430/58 |
| 4,719,163 | 1/1988 | Staudenmayer et al. | 430/58 |
| 4,882,427 | 11/1989 | Enokida et al. | 540/141 |
| 4,994,566 | 2/1991 | Mimura et al. | 430/58 |
| 5,008,173 | 4/1991 | Mimura et al. | 430/78 |
| 5,039,586 | 8/1991 | Itami et al. | 430/59 |
| 5,055,368 | 10/1991 | Nguyen et al. | 430/78 |
| 5,059,355 | 10/1991 | Ono et al. | 252/584 |
| 5,132,197 | 7/1992 | Iuchi et al. | 430/76 |
| 5,153,094 | 10/1992 | Kazmaier et al. | 540/140 |
| 5,166,339 | 11/1992 | Duff et al. | 540/141 |
| 5,182,382 | 1/1993 | Mayo et al. | 540/141 |
| 5,194,354 | 3/1993 | Takai et al. | 430/58 |
| 5,206,359 | 4/1993 | Mayo et al. | 540/141 |
| 5,238,764 | 8/1993 | Molaire et al. | 430/58 |
| 5,238,766 | 8/1993 | Molaire et al. | 430/58 |

OTHER PUBLICATIONS

P.M. Borsenberger et al., *Organic Photoreceptors for Imaging Systems*, Marcel Dekkar, Inc., New York, pp. 338–391.

*Primary Examiner*—Mukund J. Shah
*Assistant Examiner*—Pavanaram K. Sripada
*Attorney, Agent, or Firm*—John R. Everett

[57] ABSTRACT

Titanyl fluorophthalocyanines, and electrophotographic elements, and a method for preparing titanyl fluorophthalocyanine having the steps of: dissolving titanyl fluorophthalocyanine in acid to form a solution; admixing the solution and water to precipitate out amorphous titanyl fluorophthalocyanine; washing the amorphous titanyl fluorophthalocyanine until substantially all of the acid is removed; and retaining the amorphous titanyl fluorophthalocyanine under ambient conditions of wetness/dryness and temperature exclusive of conditions combining both dryness and a temperature of greater than about 50° C.

20 Claims, 9 Drawing Sheets

PREPARATION OF TITANYL FLUOROPHTHALOCYANINES

FIELD OF THE INVENTION

The invention relates to electrophotographic elements and related materials. The invention more particularly relates to methods for preparing high crystallinity titanyl fluorophthalocyanines by acid pasting under controlled conditions followed by treatment with an organic solvent having a gamma$_c$ hydrogen bonding parameter value within a selected range, electrophotographic elements incorporating such titanyl fluorophthalocyanines, and titanyl fluorophthalocyanine compositions.

BACKGROUND OF THE INVENTION

In electrophotography an image comprising a pattern of electrostatic potential (also referred to as an electrostatic latent image), is formed on a surface of an electrophotographic element comprising at least two layers: a charge generation layer and an electrically conductive substrate. The electrostatic latent image can be formed by a variety of means, for example, by imagewise radiation-induced discharge of a uniform potential previously formed on the surface. Typically, the electrostatic latent image is then developed into a toner image by contacting the latent image with an electrographic developer. If desired, the latent image can be transferred to another surface before development.

Among the many different kinds of charge generation materials which have been employed in electrophotographic elements are phthalocyanine pigments such as titanyl phthalocyanine and titanyl tetrafluorophthalocyanine. Electrophotographic recording elements containing such pigments as charge-generation materials are useful in electrophotographic laser beam printers because they are capable of providing good photosensitivity in the near infrared region of the electromagnetic spectrum, that is in the range of 700–900 nm.

Charge generation layers containing titanyl phthalocyanine pigment are produced from liquid coating compositions that include the charge generation material and a solvent solution of polymeric binder. It is necessary that the phthalocyanine be in a form, that is highly photoconductive and sufficiently and stably dispersed in the coating composition to permit its being applied at a low enough concentration to form a very thin layer having high electrophotographic speed in the near infrared range.

Titanyl phthalocyanines, including titanyl fluorophthalocyanine, can assume a variety of crystalline forms, referred to as "polymorphs", that are distinguished by differing x-ray diffraction spectra. (Crystallographic characteristics discussed herein, are based upon x-ray diffraction spectra at the Bragg angle 2θ using CuKα x-radiation at a wavelength of 1,541 Å and are ±0.2° unless otherwise indicated. Suitable x-ray diffraction techniques are described, for example, in *Engineering Solids*, T. S. Hutchinson and D. C. Baird, John Wiley and Sons, Inc., 1963 and *X-ray Diffraction Procedures for Polycrystalline and Amorphous Materials*, 2nd Ed., John Wiley and Sons, Inc., 1974. Polymorphs of titanyl phthalocyanines can be broadly divided into low crystallinity polymorphs, also referred to as "amorphous" polymorphs; and high crystallinity polymorphs.

A variety of methods have been used to produce various forms of titanyl phthalocyanine. Different methods have commonly produced titanyl phthalocyanines having differing crystallographic characteristics, i.e. different polymorphs. U.S. Pat. No. 5,166,339, to Duff et al, presents a table of polymorphs of unsubstituted titanyl phthalocyanine (also referred to as "TiOPc" in which materials bearing multiple designations are placed in four groups. Many types of TiOPc and other phthalocyanines are discussed in *Organic Photoreceptors Systems*, P. M. Borsenberger and D. S. Weiss, Marcel Dekkar, Inc., New York, pp. 338–391.

Titanyl phthalocyanine preparation methods share the common characteristic of producing pigment having a small particle size. In one group of preparation methods, crude titanyl phthalocyanine is milled, generally with a particular milling media. In another group of preparations, commonly referred to as "acid-pasting", crude titanyl phthalocyanine is dissolved in an acid solution and then mixed with a large amount of a nonsolvent to precipitate the titanyl phthalocyanine product. Some preparations combine techniques or modify a previously prepared titanyl phthalocyanine.

The following are examples of such preparation methods. U.S. Pat. No. 5,153,094, to Kazmaier, teaches an acid pasting process in which crude titanyl phthalocyanine was dissolved in trihaloacetic acid and toluene and precipitated into toluene, alcohol, water, or a water-alcohol mixture. U.S. Pat. No. 5,166,339, to Duff et al, describes a process similar to Kazmaier which utilized as nonsolvents: water, alcohol, diethyl ether, ethylene glycol, dimethyl sulfoxide, dimethyl formamide, and N-methylpyrrolidone. U.S. Pat. No. 5,182,382, to Mayo et al, teaches a process for the preparation of Type X titanyl phthalocyanine by dissolving titanyl phthalocyanine in trifluoroacetic acid and methylene chloride; adding the solution to a solvent mixture of alcohol and water; and separating and washing the product. U.S. Pat. No. 5,132,197, to Iuchi et al, teaches a method in which titanyl phthalocyanine was acid pasted, treated with methanol, and milled with ether, monoterpene hydrocarbon, or liquid paraffin to produce a titanyl phthalocyanine having main peaks of the Bragg angle 2θ with respect to X-rays of Cu Kα at 9.0, 14.2, 23.9, and 27.1 degrees (all ±0.2°). U.S. Pat. No. 5,206,359, to Mayo et al, teaches a process in which titanyl phthalocyanine produced by acid pasting is converted to type IV titanyl phthalocyanine from Type X by treatment with halobenzene. U.S. Pat. No. 5,059,355, to Ono et al, teaches a process in which α- or β-TiOPc was shaken with glass beads producing an amorphous material having no substantial peaks by X-ray diffraction. The amorphous material was stirred with heating in water and orthodichlorobenzene. Methanol was added after cooling. A crystalline material was produced which had a distinct peak at 27.3° U.S. Pat. No. 4,882,427, to Enokida et al, teaches a material having noncrystalline titanyl phthalocyanine and pseudo-noncrystalline titanyl phthalocyanine. The pseudo-noncrystalline material could be prepared by acid pasting or acid slurrying. The noncrystalline titanyl phthalocyanine could be prepared by acid pasting or acid slurrying followed by dry or wet milling, or by mechanical milling for a long time without chemical treatment. U.S. Pat. No. 5,194,354, to Takai et al, teaches that amorphous titanyl phthalocyanine prepared by dry pulverization or acid pasting can be converted, by stirring in methanol, to a low crystalline titanyl phthalocyanine having strong peaks of the Bragg angle 2θ with respect to X-rays of Cu Kα at 7.2, 14.2, 24.0 and 27.2° (all ±0.2°). The low crystalline material, it was indicated, could be treated with various organic solvents to produce crystalline materials: methyl cellosolve or ethylene for material having strong peaks at 7.4, 10.9, and 17.9°; propylene glycol, 1,3-butanediol, or glycerine for material having strong peaks at 7.6, 9.7, 12.7, 16.2, and 26.4°; and aqueous mannitol solution for material having strong peaks at 8.5 and 10.2° (all peaks ±0.2°). U.S. Pat. Nos. 4,994,566 and 5,008,173, to Mimura et al, teach a process in which non-crystalline particles produced by: acid pasting or slurrying then mechanical grinding, mechanical grinding for a very long time, or sublimation; are treated with tetrahydrofuran to produce the a titanyl phthalocyanine having infrared absorption peaks at 1,332; 1,074; 962; and 783 $cm^{-1}$ U.S. Pat. No. 5,039,586, to Itami, teaches acid pasting followed by milling in aromatic or halide with or without additional water or other solvents such as alcohols or ethers, at 20°–100° C. In an example, crude titanyl phthalocyanine was milled with α-chloronaphthalene or orthodichlorobenzene as milling medium followed by washing with acetone and methanol. The titanyl phthalocyanine produced had a first maximum intensity peak of the Bragg angle 2θ with respect to X-rays of Cu Kα at a wavelength of 1.541 Å at 27.3°±0.2° and a second maximum intensity peak at 6.8°±0.2°. This was contrasted with another titanyl phthalocyanine which was similarly milled, but not acid pasted. This material had a maximum peak at 27.3°±0.2° and a second maximum intensity peak, in the 6°–8° range, at 7.5°±0.2°. U.S. Pat. No. 5,055,368, to Nguyen et al, teaches a "salt-milling" procedure.

U.S. Pat. Nos. 5,238,764 and 5,238,766, both to Molaire, teach the preparation of different titanyl fluorophthalocyanine polymorphs by contacting amorphous titanyl fluorophthalocyanine with either an organic solvent having a $gamma_c$ hydrogen bonding parameter greater than 9.0 or an organic solvent having a hydrogen bonding parameter less than 8.0. It is noted that amorphous titanyl fluorophthalocyanines produced by acid-pasting and salt-milling procedures, unlike unsubstituted titanyl phthalocyanine, suffer a significant reduction in near infrared sensitivity when dispersed in a solvent such as methanol or tetrahydrofuran, which has a $gamma_c$ hydrogen bonding parameter value greater than 9.0; but do not suffer this reduction in sensitivity if first contacted with a material having a $gamma_c$ hydrogen bonding parameter of less than 8.0.

Acid pasting of titanyl fluorophthalocyanine is taught in U.S. Pat. No. 4,701,396. The crude pigment is dissolved in cold concentrated mineral acid, such as concentrated sulfuric acid, and then poured into ice water to precipitate the pigment. The cold temperature of the water reduces spattering and the like caused by mixing the acid and water and encourages more complete precipitation of the dissolved pigment.

Not surprisingly, acid pasting suffers from the shortcoming that some of the acid used remains as a contaminant in the precipitated phthalocyanine pigment. This causes a degradation of electrophotographic characteristics. The amount of residual acid can be reduced by washing. U.S. Pat. No. 4,701,396 teaches washing the acid pasted titanyl fluorophthalocyanine in boiling water, followed by hot filtration and air drying.

The present inventors have discovered surprising shortcomings in the procedures of U.S. Pat. No. 4,701,396.

It is therefore desirable to provide titanyl fluorophthalocyanine polymorphs that exhibit improved electrophotographic characteristics, and compostions of matter and electrophotographic elements including these polymorphs, and preparation methods.

SUMMARY OF THE INVENTION

The invention, in its broader aspects, provides titanyl fluorophthalocyanines, and electrophotographic elements, and a method for preparing titanyl fluorophthalocyanine having the steps of: dissolving titanyl fluorophthalocyanine in acid to form a solution; admixing the solution and water to precipitate out amorphous titanyl fluorophthalocyanine; washing the amorphous titanyl fluorophthalocyanine until substantially all of the acid is removed; and retaining the amorphous titanyl fluorophthalocyanine under ambient conditions of wetness/dryness and temperature exclusive of conditions combining both dryness and a temperature of greater than about 50° C.

It is an advantageous effect of at least some of the embodiments of the invention that a method is provided for producing improved titanyl fluorophthalocyanine polymorphs. New titanyl fluorophthalocyanine compositions are produced in that method, which are used to produce improved electrophotographic elements.

BRIEF DESCRIPTION OF THE FIGURES

The above-mentioned and other features and objects of this invention and the manner of attaining them will become more apparent and the invention itself will be better understood by reference to the following description of an embodiment of the invention taken in conjunction with the accompanying figures wherein.

The Figures are x-ray diffraction spectrum that exhibit peaks of the Bragg angle 2θ with respect to x-rays of Cu Kα at a wavelength of 1.5411, for the titanyl fluorophthalocyanines of the Examples and Comparative Examples, as follows.

DESCRIPTION OF PARTICULAR EMBODIMENTS

In the methods of the invention for preparing a high crystallinity titanyl fluorophthalocyanine, crude titanyl fluorophthalocyanine pigment is:
1) dissolved in acid,
2) admixed with water to precipitate the pigment as amorphous titanyl phthalocyanine,
3) washed to remove residual acid, and collected for use as amorphous titanyl fluorophthalocyanine, or
4) treated with an organic solvent to convert the amorphous pigment into a high crystallinity pigment (the specific high crystallinity pigment depends upon the $gamma_c$ hydrogen bonding parameter of the organic solvent).

The amorphous titanyl fluorophthalocyanine is kept wet, at all times, from the time it is precipitated until the amorphous pigment is converted into a high crystallinity form. In preferred embodiments of the method of the invention, the amorphous pigment is also retained, at all times, at a temperature below 80° C., or more preferably, below 50° C. In other embodiments of the method of the invention, the amorphous pigment is protected from temperatures in excess of 80° C., or more preferably 50° C.; and is used as amorphous pigment, or is dried and then treated with organic solvent. The latter embodiment is not preferred.

The present inventors have discovered that, surprisingly, novel amorphous titanyl fluorophthalocyanine polymorphs are produced in the methods of the invention. This is unexpected. The conditions from which the amorphous pigment is protected do not seem unduly harsh. U.S. Pat. No. 4,701,396 teaches, for example, washing amorphous pigment in boiling water.

The present inventors have also discovered that high crystallinity titanyl fluorophthalocyanines prepared from an amorphous pigment of the invention are also new polymorphs. This result is even more unexpected. It would have seemed reasonable to predict that the conversion of low crystallinity pigment to high crystallinity pigment should erase all "memory" of "ambient" conditions to which the amorphous pigment was exposed. As a further unpredictable feature, the high crystallinity titanyl fluorophthalocyanines of the invention have good electrophotographic properties.

Titanyl fluorophthalocyanines have the general structure:

where each of k, l, m, and n is independently an integer from 0 to 4 and at least one of k, l, m, and n is an integer from 1 to 4. In some embodiments of the invention, the titanyl fluorophthalocyanines are titanyl tetrafluorophthalocyanine. In a particular embodiment of the invention, the titanyl fluorophthalocyanines are titanyl 2,9,16,23-tetrafluorophthalocyanine. The titanyl fluorophthalocyanines of the invention are novel low crystallinity (amorphous) and high crystallinity polymorphs.

An amorphous titanyl fluorophthalocyanine of the invention (referred to herein as "cold-amorphous pigment") is prepared by a similar procedure, modified so as to protect the amorphous pigment from any exposure to a temperature in excess of 50° C. The cold-amorphous pigment has an X-ray diffraction spectrum that exhibits peaks of the Bragg angle 2θ with respect to X-rays of Cu Kα at a wavelength of 1.541 Å at 6.6, 13.4, 15.8, and 26.1° (all ±0.2° ). The preparation of a specific cold-amorphous pigment is disclosed in Example 1.

Another amorphous titanyl fluorophthalocyanine (not within the invention as claimed) is referred to herein as "hot-amorphous pigment." This material is prepared substantially by the acid pasting procedure of U.S. Pat. No. 4,701,396; however, the pigment is boiled in water, without first being dried. The preparation of a specific hot-amorphous pigment is disclosed in Comparative Example 1.

A first high crystallinity titanyl fluorophthalocyanine of the invention (referred to herein as "hot-wet-slow-high crystallinity pigment" is prepared by treating the hot-wet-amorphous pigment with an organic solvent having a gamma$_c$ hydrogen bonding parameter of less than about 5.0. The hot-wet-slow-high-crystallinity pigment has an X-ray diffraction spectrum that exhibits peaks of the Bragg angle 2θ with respect to X-rays of Cu Kα at a wavelength of 1.541 Å at 6.7, 9.5, 12.1, 13.2, 15.1, 15.9, 21.5, 23.7, 25.6, 27.1, 28.1, 30.6, 34.3, 35.0, and 37.1° (all ±0.2°). The preparation of a specific hot-wet-slow-high-crystallinity pigment is disclosed in Example 2.

A pair of high crystallinity fluorophthalocyanines of the invention are prepared by first acid pasting crude pigment into cold water, washing the amorphous pigment with cold water until the wash water reaches neutrality; then, without drying the amorphous pigment or letting the temperature reach or exceed 50° C., treating the amorphous pigment with an organic solvent having a gamma$_c$ hydrogen bonding parameter of less than about 5.0 (for a pigment referred to herein as "cold-wet-fast-high-crystallinity pigment") or treating the amorphous pigment with an organic solvent having a gamma$_c$ hydrogen bonding parameter of greater than 9.0 (for a pigment referred to herein as "cold-wet-slow-high-crystallinity pigment").

The cold-wet-fast-high-crystallinity pigment has an x-ray diffraction spectrum that exhibits peaks of the Bragg angle 2θ with respect to x-rays of Cu Kα at a wavelength of 1.541 Å at 7.3, 10.0, 11.9, 13.1, 15.1, 15.9, 22.3, 23.4, 24.5, 27.2, 29.5, 30.5, 31.2, 32.6, and 37.2° (all ±0.2°). The cold-wet-slow-high-crystallinity pigment has an x-ray diffraction spectrum that exhibits peaks of the Bragg angle 2θ with respect to x-rays of Cu Kα at a wavelength of 1.541 Å at 6.7, 9.4, 13.4, 15.1, 21.4, 23.7, 25.7, 27.0, 28.1, 30.5, 34.2, and 36.9° (all ±0.2°). The preparation of specific cold-wet-fast- and cold-wet-slow-high-crystallinity pigments are disclosed in Examples 3–4, respectively.

The methods of the invention use crude titanyl fluorophthalocyanine as a starting material. The crude material can be synthesized by a number of well-known procedures, for example, that described in U.S. Pat. No. 4,701,396. Crude pigment typically has a particle size in the range of from about 10 to 50 micrometers.

The crude pigment is dissolved in a strongly acidic solvent. Currently preferred is the inorganic solvent: concentrated sulfuric acid. Depending upon materials and conditions dissolution of the crude pigment may take from as little time as 5 minutes to as long as several days. The temperature of the acidic solvent can be varied, as a matter of convenience, to change the time it takes for the pigment to dissolve.

After the crude pigment is dissolved, the pigment solution is poured into water to precipitate the amorphous pigment. The water is preferably maintained at a temperature of less than 80° C.; or, more preferably, maintained at a temperature of less than 50° C. It is generally most convenient to use ice water. If a large container is used, stirring or the like may be necessary to prevent localized overheating.

The precipitated amorphous pigment is in water maintained at a temperature of less than 80° C., or more preferably 50° C. It is highly preferred that the temperature be continuously so maintained at all times until either conversion to high crystallinity pigment or use as low crystallinity (amorphous) pigment. For high crystallinity pigment, the amorphous pigment is kept wet at all times until conversion into the high crystallinity pigment.

The precipitated amorphous pigment is collected and washed to remove residual acid. The wash used can be water, or can be a solution or mixture of water and an organic solvent, or can be organic solvent. If organic solvent is present in the wash liquid, then the washing procedure also serves to treat the amorphous material so as to convert the amorphous pigment to high crystallinity pigment.

In a non-preferred embodiment of the invention, the amorphous pigment is washed in boiling water and then maintained wet until conversion into a high crystallinity pigment.

In the preparation of the high crystallinity pigments of the invention, amorphous pigment is treated with organic solvent (also referred to herein as a "treatment solvent"). That treatment is either accomplished as part of the washing procedure, as discussed above, or a separate step. In some embodiments of the invention, the treatment solvent is an organic solvent having a $gamma_c$ hydrogen bonding parameter greater than 9.0 (referred to herein as "high $gamma_c$ solvent"). In other embodiments of the invention, the treatment solvent is an organic solvent having a $gamma_c$ hydrogen bonding parameter less than 5.0 (referred to herein as "low $gamma_c$ solvent"). An "intermediate $gamma_c$ organic solvent ($gamma_c$=5.0–9.0) can be used, however, this is currently considered undesirable, since the high crystallinity pigment produced appears to represent a mixture of the pigments produced by use of low $gamma_c$ and high $gamma_c$ solvents (or at least a composite of their characteristics). If intermediate characteristics are desired for a particular use, it is preferred that a physical mixture of selected pigments of the invention be prepared as discussed below in relation to electrophotographic elements.

$Gamma_c$ hydrogen bonding parameter values of organic solvents can be determined by the method reported in "A Three-Dimensional Approach to Solubility", J. D. Crowley, G. S. Teague, and J. W. Lowe, *Journal Of Paint Technology*, Vol. 38, No. 496, May 1966, pp. 269–280, and further described in *CRC Handbook of Solubility Parameters and Other Cohesion Parameters*, A. Barton, CRC Press, Boca Raton,m Fla., 1983, pp. 174 and 179–180, and in the ASTM D3132 standard test method. The method comprises measuring the effect of the solvent on deuterated methanol in terms of the frequency of the infrared radiation absorbed by the O-D bond of deuterated methanol and comparing that effect to the effect of benzene on the same bond. The value of the $gamma_c$ hydrogen bonding parameter for the solvent being tested is then determined in accordance with the equation:

$$gamma_c = \{(nu_{benzene}) - (nu_{solvent})\}/10$$

where "$nu_{benzene}$" is the wave number (expressed as $cm^{-1}$) of the infrared radiation absorbed by the O-D bond of deuterated methanol in contact with benzene, and "$nu_{solvent}$" is the wave number of the infrared radiation absorbed by the O-D bond of deuterated methanol in contact with the solvent being tested.

$Gamma_c$ hydrogen bonding parameter values of numerous organic solvents have been determined. A list for some common solvents is presented in Table 1.

TABLE 1

| Solvent | $Gamma_c$ hydrogen bonding parameter value |
| --- | --- |
| benzene | 0.0 |
| dichloromethane | 1.5 |
| 1,1,2-trichloroethane | 1.5 |
| chlorobenzene | 1.5 |
| dichloropropane | 1.5 |
| chloroform | 1.5 |
| ethylene chloride | 1.5 |
| toluene | 4.5 |
| xylene | 4.5 |
| acetonitrile | 6.3 |
| methyl benzoate | 6.3 |
| anisole | 7.0 |
| diethyl ketone | 7.7 |
| methyl ethyl ketone | 7.7 |
| methyl isobutyl ketone | 7.7 |
| acetone | 9.7 |
| butylrolactone | 9.7 |
| dioxane | 9.7 |
| tetrahydrofuran | 9.9 |
| cyclohexanone | 11.7 |
| N,N-dimethylformamide | 11.7 |
| 2-ethoxyethanol | 13.0 |
| ethanol | 18.7 |
| methanol | 18.7 |
| butanol | 18.7 |
| pyridine | 18.1 |
| ethylene glycol | 20.6 |

The reasons or mechanism for the effect of solvent treatment are not understood. It is known that solvent treatment only effects amorphous titanyl fluorophthalocyanine. Highly crystalline titanyl fluorophthalocyanine pigment is not effected by further treatment with organic solvent. Highly crystalline titanyl fluorophthalocyanine is also not effected by dryness or temperatures in excess of 50° C. or both. The highly crystalline titanyl fluorophthalocyanine produced can thus be isolated and dried as convenient. For example, the high crystallinity pigment can be collected, washed with an organic solvent such as acetone, and dried at an elevated temperature.

In an alternative embodiment of the method of the invention, the starting material for the acid pasting step is not crude pigment; but rather highly crystalline titanyl fluorophthalocyanine pigment. The same procedures are followed as for crude pigment. The amorphous pigment produced (dried at <50° C.), like the cold dried amorphous pigment produced from crude starting material, exhibits peaks of the Bragg angle 2θ with respect to X-rays of Cu Kα at a wavelength of 1.541 Å at 6.6, 13.4, 15.8, and 26.1° (all ±0.2°). The highly crystalline titanyl fluorophthalocyanine used as starting material in this embodiment can be a pigment of the invention or a pigment produced by another method, for example, acid pasting and high temperature drying.

The electrophotographic elements of the invention include titanyl fluorophthalocyanine pigments of the invention, that serve as charge generation materials in the elements. The electrophotographic elements of the invention can be of various types, including both those commonly referred to as single layer or single-active-layer elements and those commonly referred to as multiactive, or multi-active-layer elements. All of the electrophotographic elements of the invention have multiple layers, since each element has at least an electrically conductive layer and one photogenerating (charge generation) layer, that is, a layer which includes, as a charge generation material, the titanyl fluorophthalocyanine pigment of the invention.

Single-active-layer elements are so named because they contain only one layer, referred to as the photoconductive layer, that is active both to generate and to transport charges in response to exposure to actinic radiation. Such elements have an additional electrically conductive layer in electrical contact with the photoconductive layer. In single-active-layer elements of the invention, the photoconductive layer contains titanyl fluorophthalocyanine pigments of the invention as charge-generation material to generate electron/hole pairs in response to actinic radiation and a charge-transport material, which is capable of accepting electrons generated by the charge-generation material and transporting them through the layer to effect discharge of the initially uniform electrostatic potential. The electron-transport agent and titanyl fluorophthalocyanine pigment of the invention are dispersed as uniformly as possible in the photoconductive layer. The photoconductive layer also contains an electrically insulative polymeric film-forming binder. The photoconductive layer is electrically insulative except when exposed to actinic radiation.

Multiactive layer elements are so named because they contain at least two active layers, at least one of which is capable of generating charge, that is, electron/hole pairs, in response to exposure to actinic radiation and is therefore referred to as a charge-generation layer (CGL), and at least one of which is capable of accepting and transporting charges generated by the charge-generation layer and is therefore referred to as a charge-transport layer (CTL). Such elements typically comprise at least an electrically conductive layer, a CGL, and a CTL. Either the CGL or the CTL is in electrical contact with both the electrically conductive layer and the remaining CTL or CGL. The CGL contains titanyl fluorophthalocyanine pigment of the invention as charge-generation material and a polymeric binder. The CTL contains a charge-transport agent and a polymeric binder.

Single-active-layer and multiactive layer electrophotographic elements and their preparation and use in general, are well known and are described in more detail, for example, in U.S. Pat. Nos. 4,701,396; 4,666,802; 4,578,334; 4,719,163; 4,175,960; 4,514,481; and 3,615,414, the disclosures of which are incorporated herein by reference.

In preparing the electrophotographic elements of the invention, the components of the photoconductive layer (in single-active-layer elements) or CGL (in multiactive layer elements), including binder and any desired addenda, are dissolved or dispersed together in a liquid to form an electrophotographic coating composition which is then coated over an appropriate underlayer, for example, a support or electrically conductive layer. The liquid is then allowed or caused to evaporate from the mixture to form the permanent photoconductive layer or CGL. The titanyl fluorophthalocyanine pigment can be mixed with the solvent solution of polymeric binder immediately or can be stored for some period of time before making up the coating composition.

Two or more titanyl fluorophthalocyanine pigments of the invention can be added to the coating composition. If desired the pigments can first be combined as a dry physical mixture before addition to the coating composition.

The polymeric binder used in the preparation of the coating compostion can be any of the many different binders that are useful in the preparation of electrophotographic layers. The polymeric binder is a film-forming polymer having a fairly high dielectric strength. In a preferred embodiment of the invention, the polymeric binder also has good electrically insulating properties. The binder should provide little or no interference with the generation and transport of charges in the layer. The binder can also be selected to provide additional functions. For example, adhering a layer to an adjacent layer; or, as a top layer, providing a smooth, easy to clean, wear-resistant surface. Representative binders are film-forming polymers having a fairly high dielectric strength and good electrically insulating properties. Such binders include, for example, styrene-butadiene copolymers; vinyl toluene-styrene copolymers; styrene-alkyd resins; silicone-alkyd resins; soya-alkyd resins; vinylidene chloride-vinylchloride copolymers; poly (vinylidene chloride); vinylidene chloride-acrylonitrile copolymers; vinyl acetate-vinyl chloride copolymers; poly (vinyl acetals), such as poly(vinyl butyral); nitrated polystyrene; poly(methylstyrene); isobutylene polymers; polyesters, such as poly(ethylenecoakylenebis (alkyleneoxyaryl) phenylenedicarboxylate); phenol-formaldehyde resins; ketone resins; polyamides; polycarbonates; polythiocarbonates; poly{ethylen-coisopeopyliden-2,2-bis(ethylenoxyphenylene) terephthalate}; copolymers of vinyl haloacrylates and vinyl acetate such as poly(vinyl-m-bromobenzoate-covinyl acetate); chlorinated poly(olefins), such as chlorinated poly (ethylene); cellulose derivatives such as cellulose acetate, cellulose acetate butyrate and ethyl cellulose; and polyimides, such as poly{1,1,3-trimethyl-3-(4'-phenyl)-5-indane pyromellitimide}. Examples of binder polymers which are particularly desirable from the viewpoint of minimizing interference with the generation or transport of charges include: bisphenol A polycarbonates and polyesters such as poly[(4,4'-norbomylidene diphenylene terephthalate-co-azelate].

Suitable organic solvents for forming the polymeric binder solution can be selected from a wide variety of organic solvents, including, for example, aromatic hydrocarbons such as benzene, toluene, xylene and mesitylene; ketones such as acetone, butanone and 4-methyl-2-pentanone; halogenated hydrocarbons such as dichloromethane, trichloroethane, methylene chloride, chloroform and ethylene chloride; ethers including ethyl ether and cyclic ethers such as dioxane and tetrahydrofuran; other solvents such as acetonitrile and dimethylsulfoxide; and mixtures of such solvents. The amount of solvent used in forming the binder solution is typically in the range of from about 2 to about 100 parts of solvent per part of binder by weight, and preferably in the range of from about 10 to 50 parts of solvent per part of binder by weight.

In the coating composition, the optimum ratio of titanyl fluorophthalocyanine to binder or of titanyl fluorophthalocyanine and charge transport material to binder can vary widely, depending on the particular materials employed. In general, useful results are obtained when the total concentration of both titanyl fluorophthalocyanine and charge transport material in a layer is within the range of from about 0.01 to about 90 weight percent, based on the dry weight of the layer. In a preferred embodiment of a single active layer electrophotographic element of the invention, the coating composition contains from about 10 to about 70 weight percent of a charge-transport agent and from 0.01 to about 50 weight percent of titanyl fluorophthalocyanine pigment of the invention. In a preferred embodiment of a multiple active layer electrophotographic element of the invention, the coating composition contains from about 0 to about 40 weight percent of a charge-transport agent and from 0.01 to about 80 weight percent of titanyl fluorophthalocyanine pigment of the invention.

Polymeric binders useful for the CGL or photoconductor layer can also be used in producing a CTL. Any charge transport material can be utilized in elements of the invention. Such materials include inorganic and organic (including monomeric organic, metallo-organic and polymeric organic) materials); for example, zinc oxide, lead oxide, selenium, phthalocyanine, perylene, arylamine, polyarylalkane, and polycarbazole materials, among many others. The CTL can be solvent coated or can be produced in some other manner, for example, by vacuum deposition.

CGL's and CTL's in elements of the invention can optionally contain other addenda such as leveling agents, surfactants, plasticizers, sensitizers, contrast control agents, and release agents, as is well known in the art.

Various electrically conductive layers or supports can be employed in electrophotographic elements of the invention, for example, paper (at a relative humidity above 20 percent) aluminum-paper laminates; metal foils such as aluminum foil, zinc foil, and the like; metal plates such as aluminum, copper, zinc, brass and galvanized plates; vapor deposited metal layers such as silver, chromium, vanadium, gold, nickel, aluminum and the like; and semiconductive layers such as cuprous iodide and indium tin oxide. The metal or semiconductive layers can be coated on paper or conventional photographic film bases such as poly(ethylene terephthalate), cellulose acetate, polystyrene, etc. Such conducting materials as chromium, nickel, etc. can be vacuum-deposited on transparent film supports in sufficiently thin layers to allow electrophotographic elements so prepared to be exposed from either side.

Electrophotographic elements of the invention can include various additional layers known to be useful in electrophotographic elements in general, for example, subbing layers, overcoat layers, barrier layers, and screening layers.

The following Examples and Comparative Examples are presented to further illustrate some preferred modes of practice of the invention. Unless otherwise indicated, all starting materials were commercially obtained.

Red and near infrared photosensitivity of electrophotographic elements was evaluated by electrostatically corona-charging the element to an initial potential of −700 volts and exposing the element to 150 microsecond flash of a xenon lamp mounted with a 775 nm narrow band pass filter (approximately 10 nm band, peak intensity output at 775 nm), in an amount sufficient to photoconductively discharge the initial potential down to a level of −350 volts (50% photodischarge). Photosensitivity was measured in terms of the amount of incident actinic radiant energy (expressed in ergs/cm$^2$) needed to discharge the initial voltage down to the desired level. The lower the amount of radiation needed to achieve the desired degree of discharge, the higher is the photosensitivity of the element. Dark decay was determined by letting an unexposed area of the charged element spontanously discharge in the the dark for seven seconds. The dark decay was calculated by dividing the amount of dark discharge (after seven seconds) by seven.

Preparation of Crude Titanyl Tetrafluorophthalocyanine

4-Fluorophthalonitrile (38.7 grams, 0.267 mole) and titanium trichloride (20.7 grams, 0.134 mole) were suspended in 200 ml of 1-chloronaphthalene and heated to 210°–215° C. and maintained for 2.5 hours at this temperature. The reaction mixture was cooled slightly, and the dark solid was collected and washed with acetone and methanol. After drying, the dark blue solid (34 grams) was slurried twice in refluxing dimethylformamide, filtered hot each time, and washed with acetone to yield crude titanyl 2,9,16,23-tetrafluorophthalocyanine.

EXAMPLE 1

Figure 1:
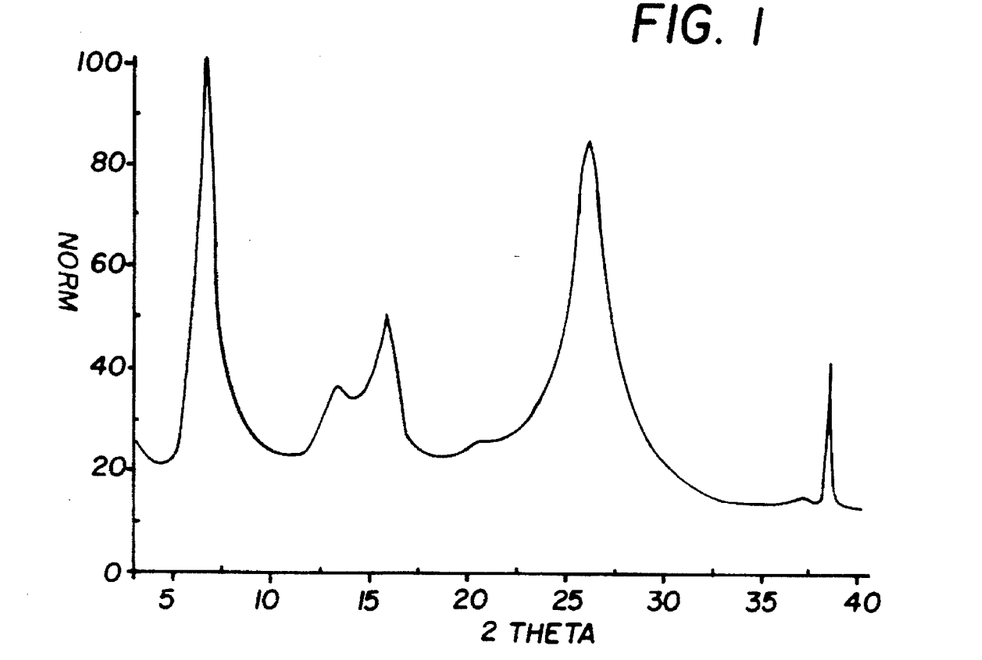
FIG. 1: Example 1.

Crude titanyl tetrafluorophthalocyanine pigment (1 kilogram) was dissolved in concentrated sulfuric acid (10 liters) over two hours. The temperature of the solution was maintained between 9° and 21° C. The solution was filtered through a sintered glass funnel and then slowly poured into water over 105 minutes. The water temperature was maintained between 24° and 46° C. The precipitated amorphous titanyl fluorophthalocyanine was allowed to settle. The water was decanted from the pigment. The pigment was washed with water and the water decanted four times. The pigment was then poured into a cloth-lined funnel and rinsed with water until the rinse water tested neutral. The pigment was then stored as a wet cake, at room temperature in a sealed container. A portion of the wet cake was removed and allowed to dry at room temperature. A powder x-ray diffraction spectrum was taken and is shown in FIG. 1. Results are summarized in Tables 2–3.

COMPARATIVE EXAMPLE 1

Figure 2:
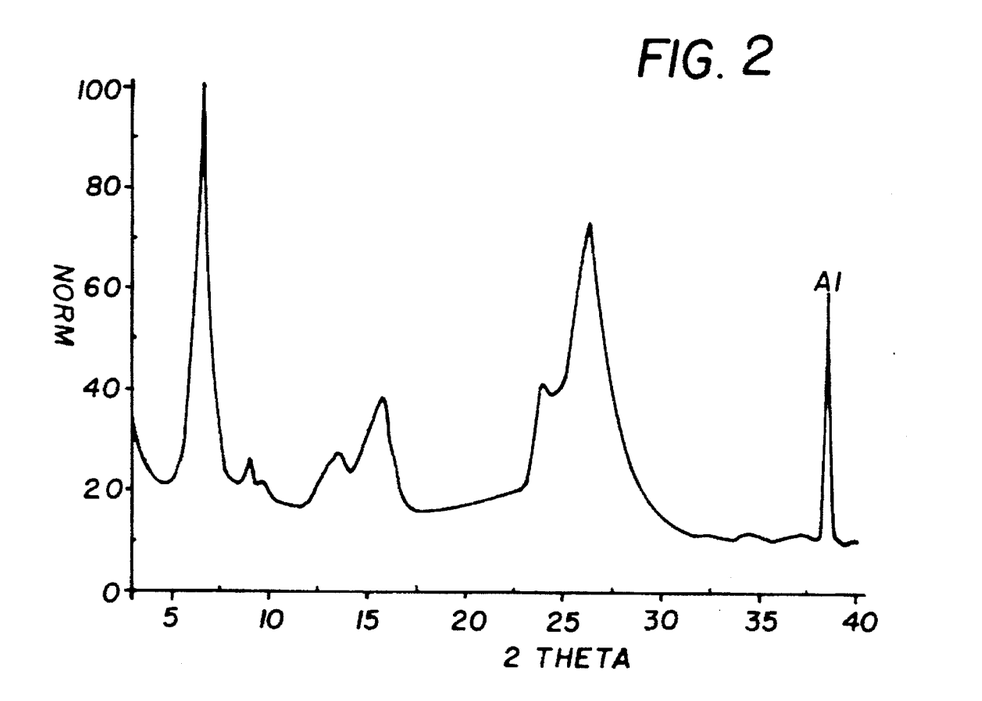
FIG. 2: Comparative Example 1.

A portion of the wet pigment cake of Example 1 was added to water and boiled. The pigment was collected in a filter, then redispersed in water and this was repeated for a total of three washes. The final wash water was found to have a pH of 7. The pigment was collected in a filter and dried. A powder x-ray diffraction spectrum was taken and is shown in FIG. 2. Results are summarized in Tables 2–3.

COMPARATIVE EXAMPLE 2

Figure 3:
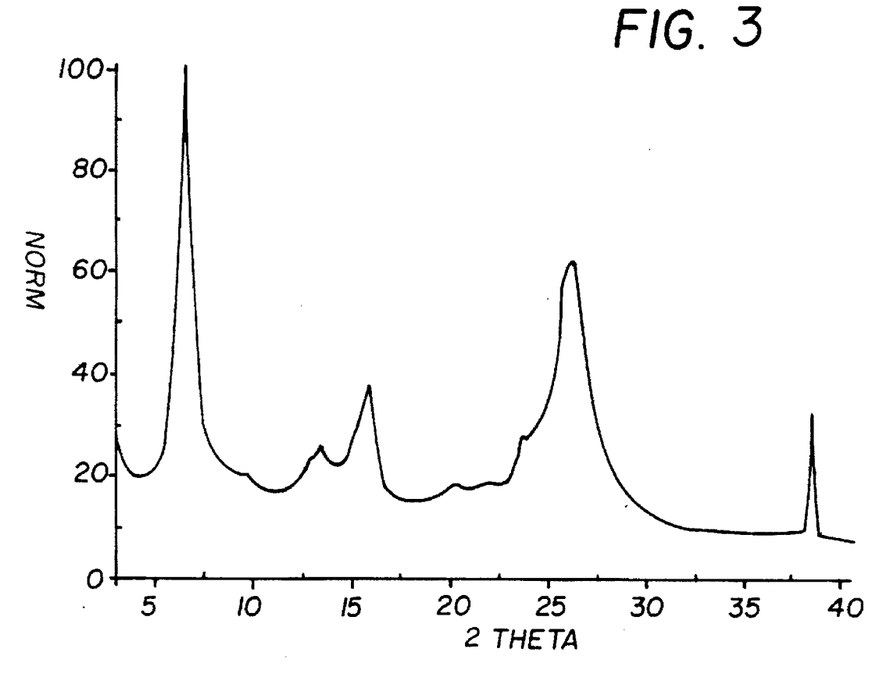
FIG. 3: Comparative Example 2.

A portion of the wet pigment cake of Example 1 was dried in a steam cabinet, ground in a mortar and then added to water and boiled. The pigment was collected in a filter, then redispersed in water and this was repeated for a total of four washes. The final wash water was found to have a pH of 2. The pigment was collected in a filter and dried. A powder x-ray diffraction spectrum was taken and is shown in FIG. 3. Results are summarized in Tables 2–3.

TABLE 2

Preparation of amorphous titanyl fluorophthalocyanine pigments

| Ex or Comp. Ex | Preparation (after dissolving crude pigment in acid) | Highest temperature |
|---|---|---|
| Ex 1 | precipitated (<50° C.), washed (<50° C.) | below 50° C. |
| Comp. Ex 1 | precipitated (<50° C.), washed with boiling water while wet | above 80° C. |
| Comp. Ex 2 | dried, washed with boiling water | above 80° C. |

TABLE 3

X-ray diffraction spectra of amorphous titanyl fluorophthalocyanine pigments

| Ex or Comp. Ex | Relative peak heights (largest = 100) at Bragg angle 2θ (in degrees ± 0.2 degrees)* | | | | | | |
|---|---|---|---|---|---|---|---|
| 2θ = | 6.7° | 9.1° | 12.8° | 13.4° | 15.8° | 23.7° | 26.1° |
| Ex 1 | 100 | — | — | 7 | 24 | — | 75 |
| Comp. Ex 1 | 100 | 11 | — | 9 | 25 | 28 | 69 |
| Comp. Ex 2 | 100 | — | 12 | 15 | 28 | 14 | 37 |

*Peaks having a normalized value of less than about 5 are not listed.

COMPARATIVE EXAMPLE 3

Figure 4:
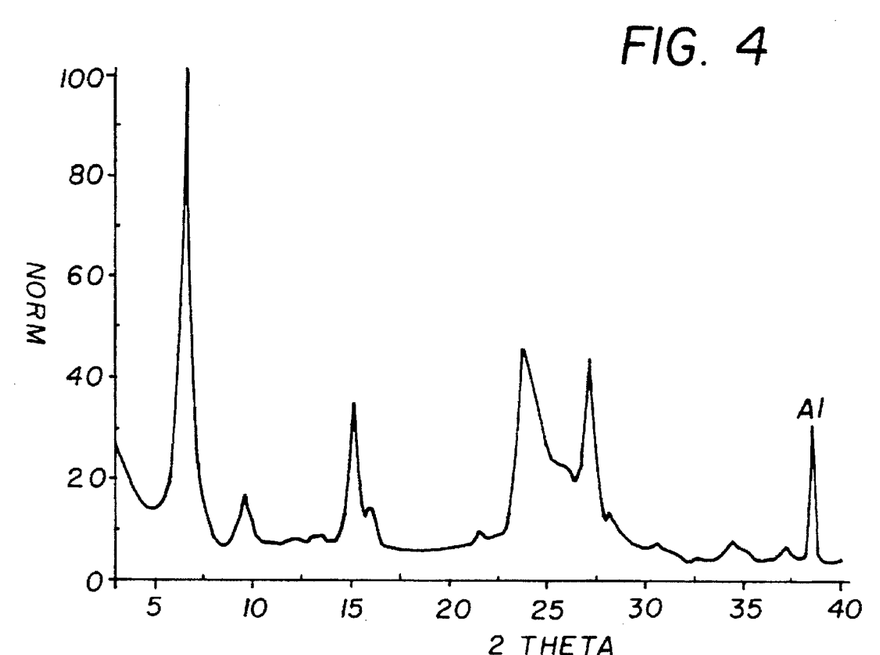
FIG. 4: Comparative Example 3.

A portion of the pigment prepared in Comparative Example 2 (about 260 grams) was mixed with about 1400 mL of a blend of dichloromethane and water (1:1). (Dichloromethane has a gamma$_c$ hydrogen bonding parameter of less than 7.0) The dichloromethane was refluxed then distilled off, and the pigment was collected in a filter. This was repeated for a total of six times. Water filtered off the final time had a neutral pH. The pigment was then dried. A powder x-ray diffraction spectrum was taken and is shown in FIG. 4.

An electrophotographic element was then prepared using a conductive support having a nickel layer deposited, by vacuum evaporation, to an optical density of 0.4 onto a 175 micron thick Estar™ poly (ethylene terephtalate) film, marketed by Eastman Kodak Company of Rochester, N.Y. Coatings were applied using an extrusion hopper coating machine. The bare conductive support was first undercoated with a barrier layer of a polyamide resin marketed by Toray Chemical Inc of Japan as Amilan CM8000, (2% weight/weight solution) in ethanol solvent with the hopper coating machine at an application rate of 0.05 grams(dry)/ft$^2$.

A charge generation coating composition was prepared by admixing the titanyl fluorophthalocyanine pigment (0.5 parts by weight), tri-4-tolylamine (0.06 parts by weight), 1,1-bis(4-(di-4-tolylamino)phenyl)cyclohexane (0.06 parts by weight), and (poly{4,4'-(2-norbornylidene)bisphenylene terphthalate-co-azelate 60/40) binder (0.58 parts by weight); in terahydrofuran (THF) to provide a four weight/weight percent solution (weight of titanyl fluorophthalocyanine/weight of solution). The resulting coating composition was coated over the barrier layer. The resulting charge generation layer was 0.5 micrometers thick.

A charge transport coating composition was prepared by admixing tri-4-tolylamine (0.2 parts by weight), 1,1-bis(4-(di-4-tolylamino)phenyl}cyclohexane (0.2 parts by weight), and (poly{4,4'-(2-norbornylidene)bisphenylene terphthalate-co-azelate 60/40} binder (0.6 parts by weight); in tetrahydrofuran (THF) to provide a 12 weight/weight percent solution (total solids/solution). The resulting coating composition was coated over the charge generation layer. The resulting charge transport layer was 24 micrometers thick.

The resulting electrophotographic elements were charged to 700 negative voltage, and exposed to 150 microsecond flash of a xenon lamp mounted with a 775 nm narrow band pass filter, as discussed above, to evaluate photosensitivity and dark decay. The 50% photodecay energies for each of the sample are shown on Table 4, along with dark decay rates.

Results are summarized in Tables 4–5.

EXAMPLE 2

Figure 5:
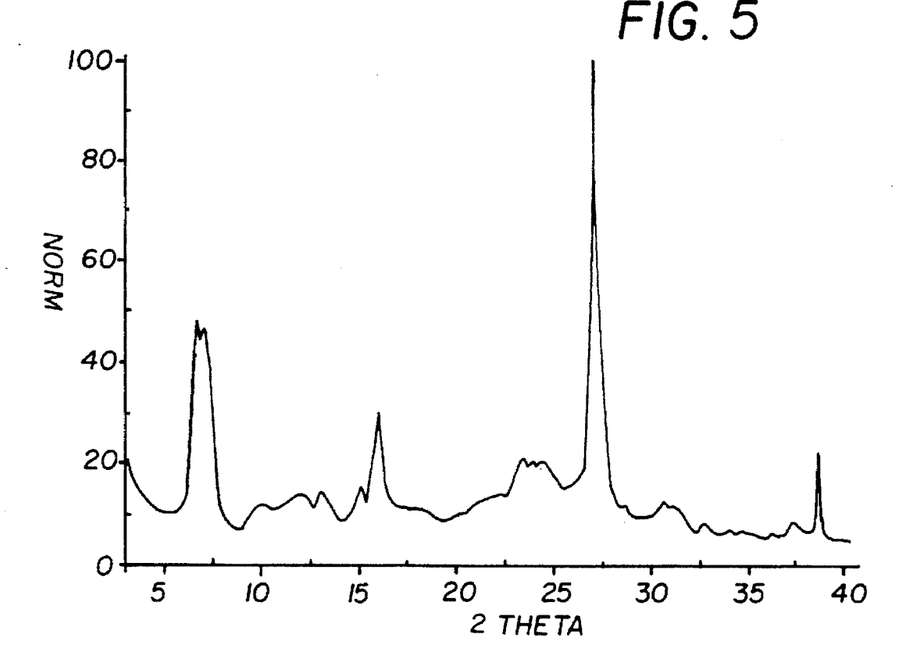
FIG. 5: Example 2.

A portion of the pigment prepared in Comparative Example 3 was treated with dichloromethane using substantially the same procedures as in Comparative Example 3. A powder x-ray diffraction spectrum was taken and is shown in FIG. 5. An electrophotographic element was prepared and evaluated substantially as describe in Comparative Example 3. Results are summarized in Tables 4–5.

EXAMPLE 3

Figure 6:
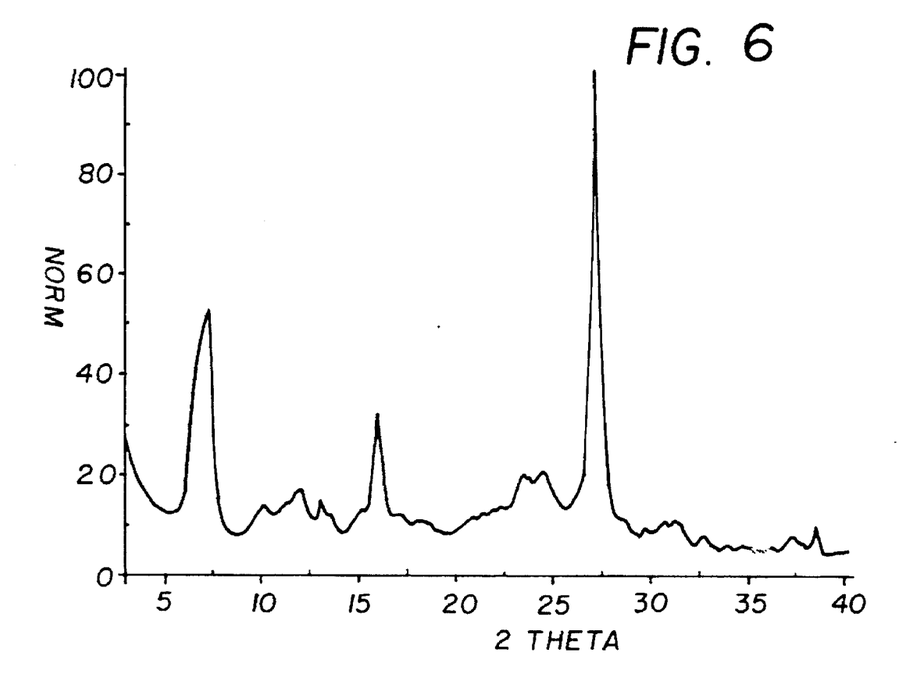
FIG. 6: Example 3.

A portion of the wet pigment cake prepared in Example 1 was treated, without drying, with dichloromethane using substantially the same procedures as in Comparative Example 3. A powder x-ray diffraction spectrum was taken and is shown in FIG. 6. An electrophotographic element was prepared and evaluated substantially as describe in Comparative Example 3. Results are summarized in Tables 4–5.

EXAMPLE 4

Figure 7:
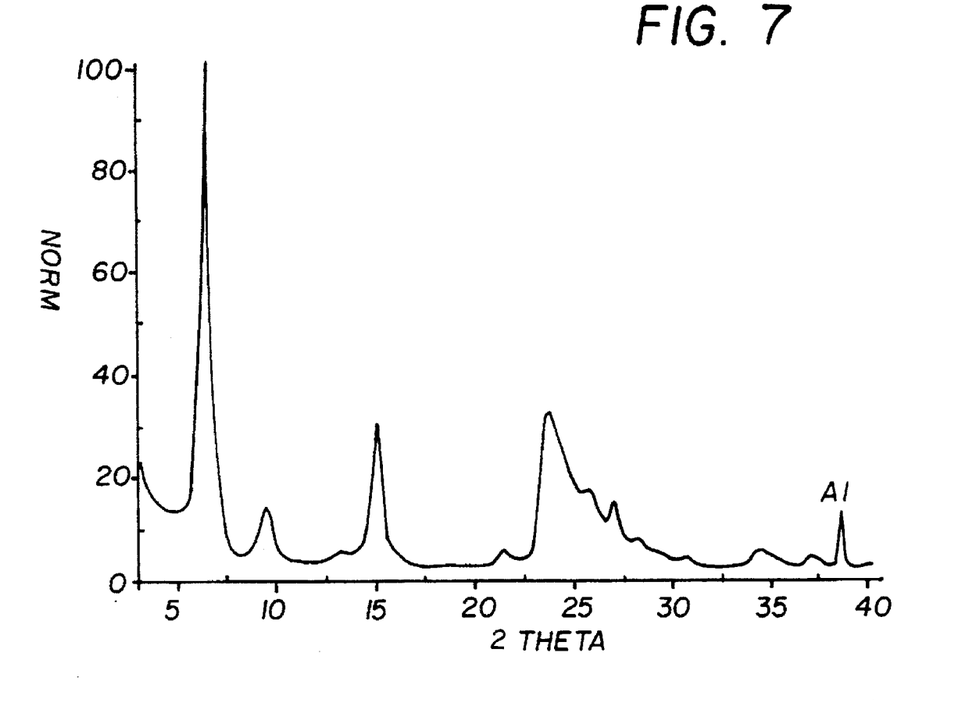
FIG. 7: Example 4.

A portion of the wet pigment of Example 1 (about 135 grams) was mixed with methanol (about 500 mL), an organic solvent having hydrogen parameter gamma$_c$ greater than 10.0. The mixture was stirred and filtered through a sintered glass funnel. The sample was redispersed in methanol, refluxed for one hour, filtered, dried at room temperature, and ground in a mortar. The pigment was then added to water, boiled, and collected in a filter; and this was repeated until the filtrate become pH neutral. The pigment was then dried in a vacuum oven at 50–60 degree centigrade. The x-ray diffraction of the resulting powder is shown in FIG. 7. An electrophotographic element was prepared and evaluated substantially as described in Comparative Example 3. Results are summarized in Tables 4–5.

TABLE 4

Preparation of high crystallinity titanyl fluorophthalocyanine pigments and electrophotographic properties of elements

| Ex or Comp. Ex | Preparation (after dissolving crude pigment in acid) | Conditions | Speed (erg/cm$^2$) | Dark decay (v/sec) |
|---|---|---|---|---|
| Comp. Ex 3 | precipitated (<50° C.), dried, washed with boiling water, redried, washed with DCM/H$_2$O | above 80° C. dried low gamma$_c$ | 3.0 | 6.7 |
| Ex 2 | precipitated cold, washed with boiling water while wet, washed with DCM/H$_2$O | above 80° C. wet low gamma$_c$ | 7.9 | 3.9 |
| Ex 3 | precipitated cold, washed with DCM/H$_2$O while wet | below 50° C. wet low gamma$_c$ | 2.1 | 3.8 |
| Ex 4 | precipitated cold, washed with methanol while wet, washed with boiling water | below 50° C. wet high gamma$_c$ | 15.9 | 3.3 |

"Conditions" indicates the maximum temperature encountered by the pigment, while in the amorphous form; whether the amorphous pigment was wet or dry when treated with organic solvent; and whether the gamma$_c$ of a treating organic solvent was "high" (greater than 9) or "low" (less than 7).

TABLE 5

X-ray diffraction spectra of highly crystalline titanyl fluorophthalocyanine pigments

| Ex or Comp. Ex | Relative peak heights (largest = 100) at Bragg angle 2θ (in degrees ± 0.2 degrees)* | | | | | | |
|---|---|---|---|---|---|---|---|
| 2θ | 6.6° | 7.2° | 9.3° | 10.8° | 11.9° | 13.1° | 15.1° |
| Comp. Ex 3 | 47 | 44 | — | 12 | — | — | — |
| Ex 2 | 100 | — | 11 | — | — | — | 32 |
| Ex 3 | — | 49 | — | — | 7 | 5 | — |
| Ex 4 | 100 | — | 11 | — | — | — | 29 |

| Ex or Comp. Ex | Relative peak heights (largest = 100) at Bragg angle 2θ (in degrees ± 0.2 degrees) | | | | | |
|---|---|---|---|---|---|---|
| 2θ | 15.8° | 23.4° | 23.7° | 24.5° | 25.6° | 27.1° |
| Comp. Ex 3 | 23 | — | — | — | — | 100 |
| Ex 2 | 10 | — | 40 | — | 17 | 36 |

TABLE 5-continued

| Ex 3 | 25 | 6  | —  | 7  | —  | 100 |
| Ex 4 | —  | —  | 30 | —  | 14 | 12  |

*Peaks having a normalized value of less than about 5 are not listed.

The cold-wet-fast-high crystalline titanyl 7phtalocyanine of Example 3 had the most sensitivity (lowest numeric value) and the cold-wet-slow-high crystalline titanyl phtalocyanine of Example 4 had the least sensitivity.

COMPARATIVE EXAMPLE 4

Figure 8:
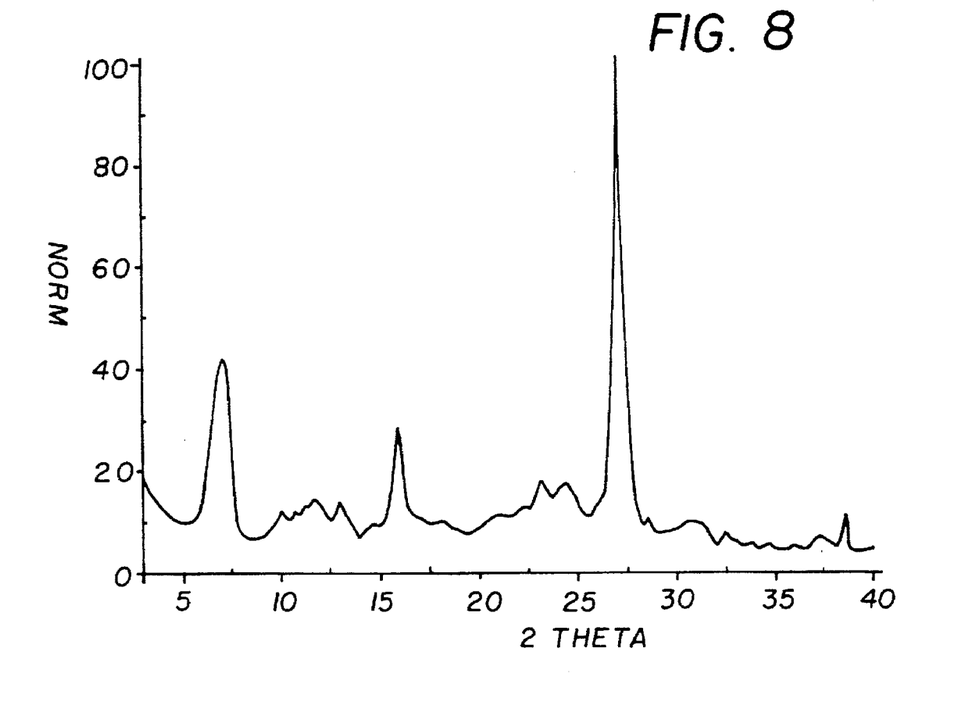
FIG. 8: Comparative Example 4.

A portion of the pigment prepared in Comparative Example 2 was mixed with dichloromethane (300 grams, gamma$_c$ hydrogen bonding parameter=1.5), and 2 mm diameter stainless steel shot (300 grams), in a 12 ounce jar. The pigment was milled in a Sweco Vibro Energy grinding mill manufactured by Sweco, Inc. of Florence, Ky., for 3 days and the shot was removed. The pigment was filtered, washed with dichloromethane, dried, and collected. An x-ray diffraction spectrum was taken of the resulting high crystallinity titanyl fluorophthalocyanine product and is presented in FIG. 8. A sample of the pigment was titrated for residual sulfuric acid. The measured concentration of sulfuric acid was 0.58 weight/weight percent.

An electrophotographic element was prepared and evaluated substantially as describe in Comparative Example 3, with the exception that, rather than a polyester binder, a binder of Lexan 145 polycarbonate (marketed by General Electric Co. of Schenectady, N.Y.) was used, and a single charge transport material, 1,1-bis(di-4-tolylaminophenyl)-3-phenylpropane. The charge transport layer consisted of a polycarbonate sold by Mobay Chemical Co. under the trademark Makrolon, and the charge transport material, 1,1-bis(di-4-tolylaminophenyl)-3-phenylpropane (1:1 Wt/Wt). A dichloromethane/1,1,2-trichloromethane 60:40 solvent mixture was used for both layers. Results are summarized in Tables 6–7.

EXAMPLE 5

Figure 9:
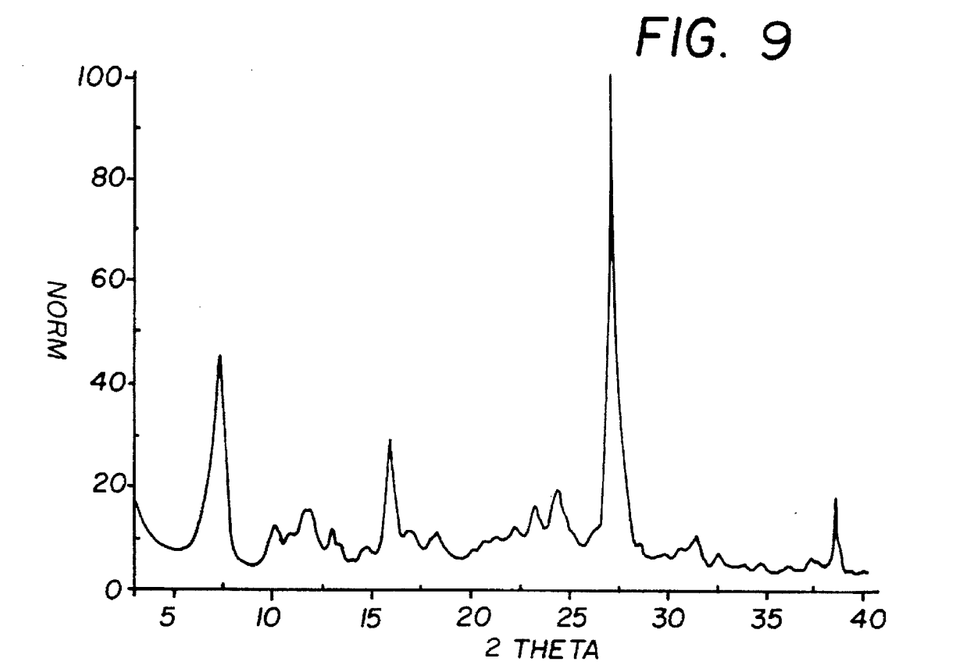
FIG. 9: Example 5.
Figure 10:
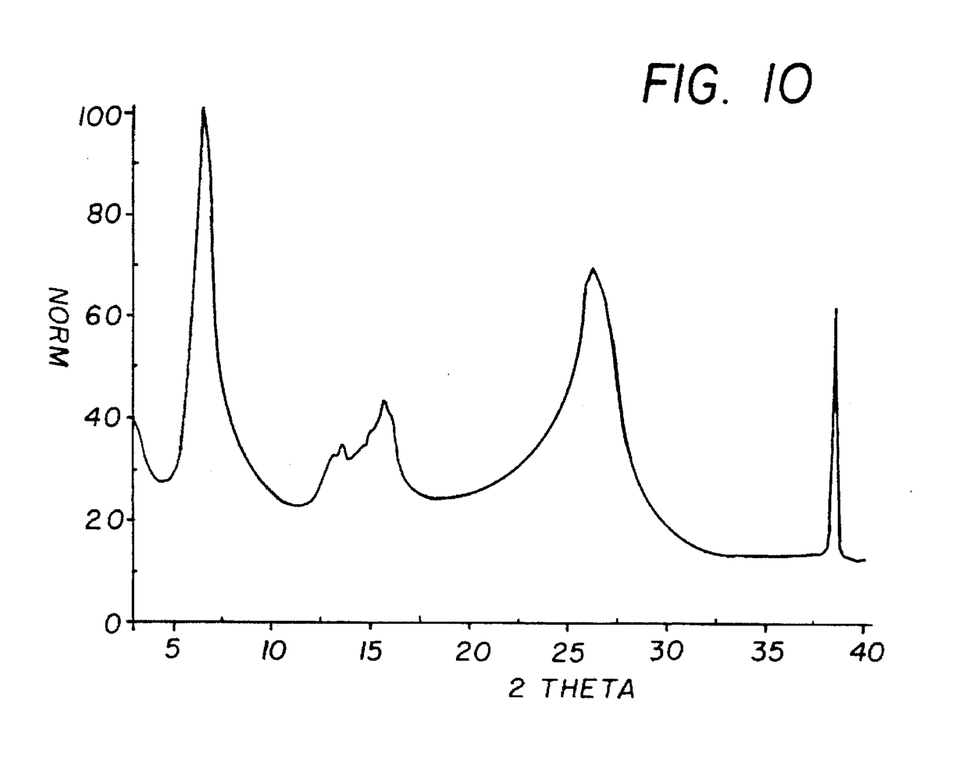
FIG. 10: Example 6.
Figure 11:
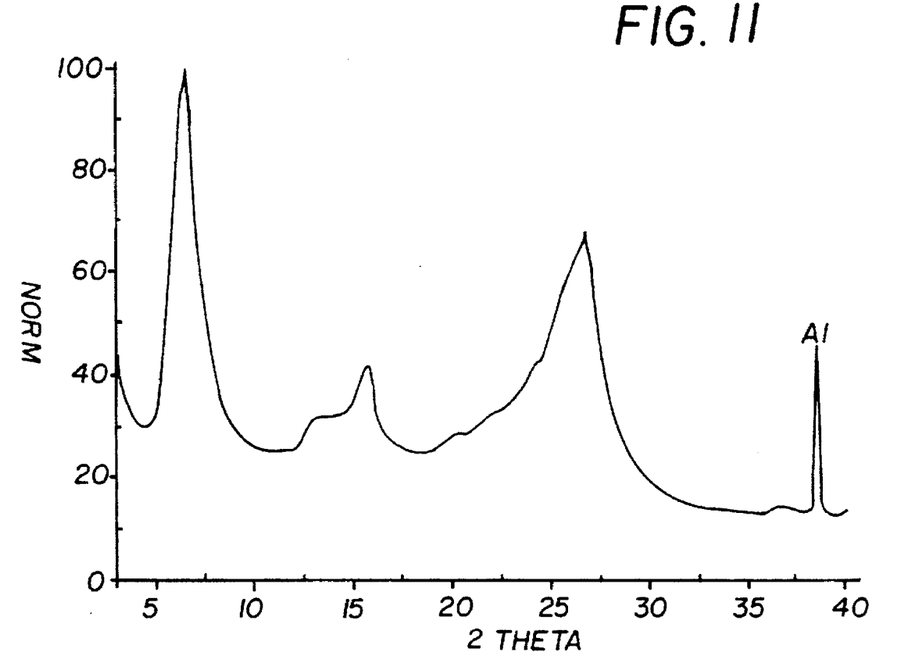
FIG. 11: Example 7.
Figure 12:
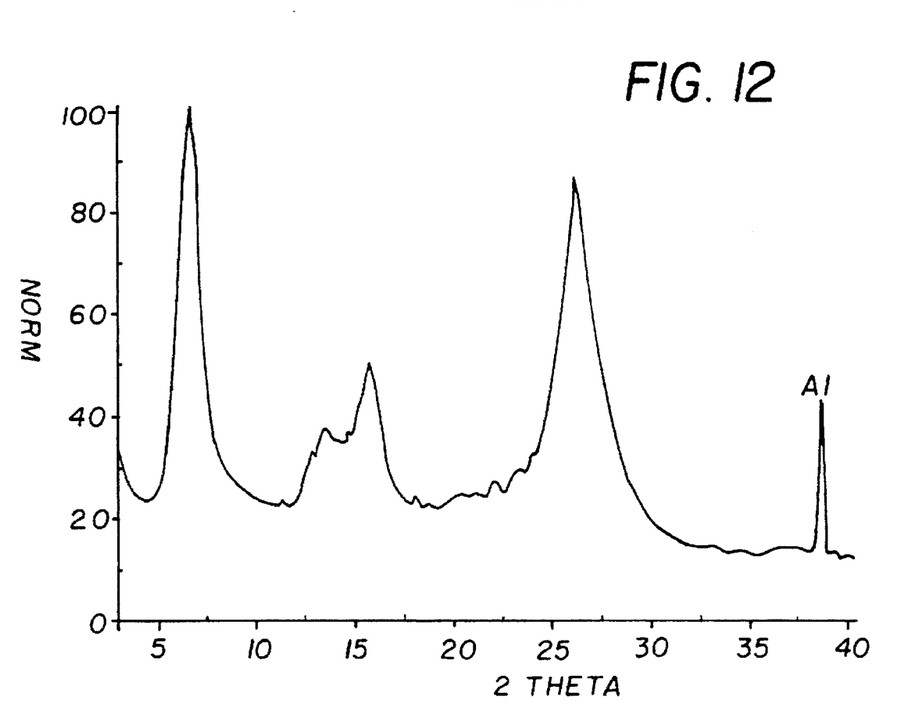
FIG. 12: Example 8.
Figure 13:
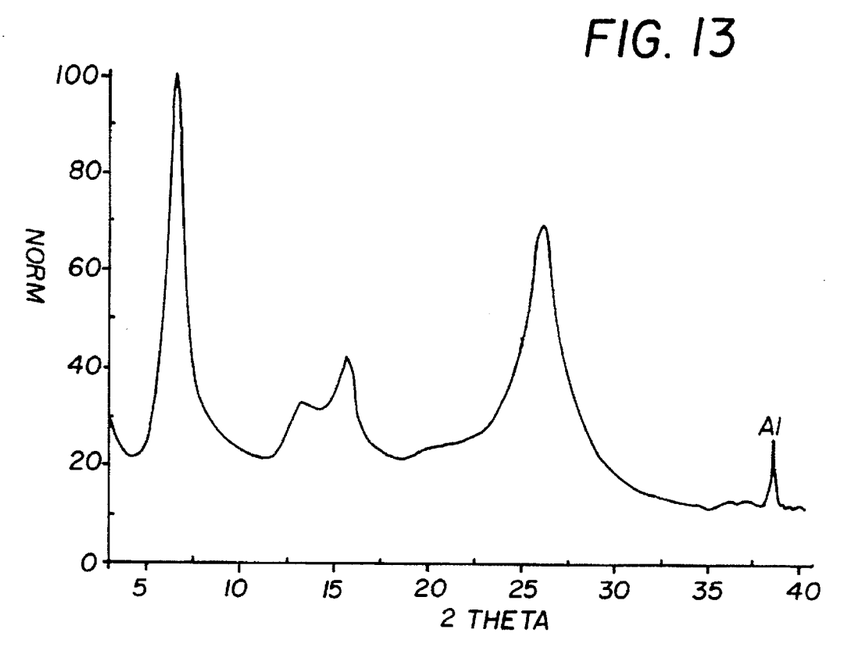
FIG. 13: Example 9.
Figure 14:
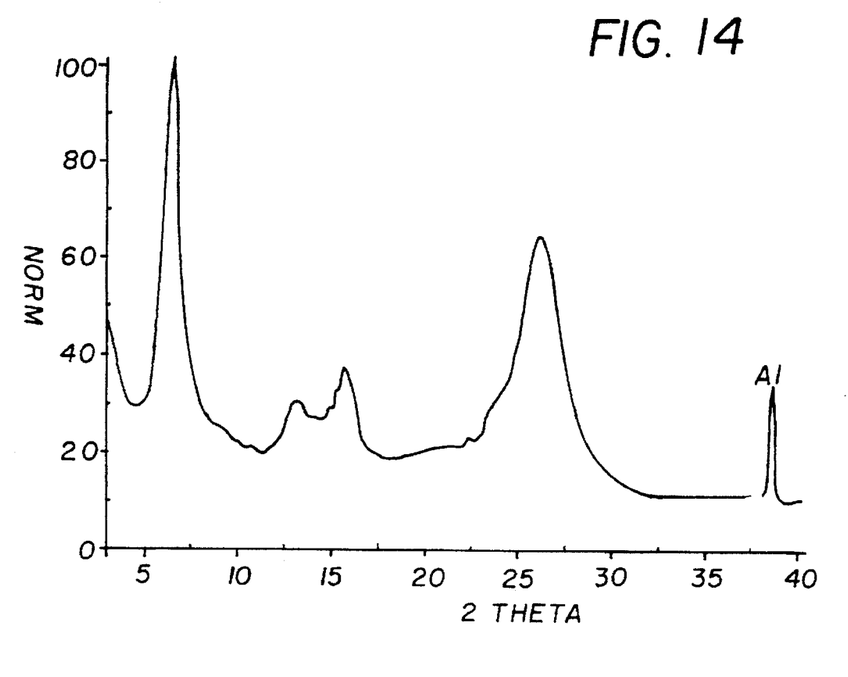
FIG. 14: Comparative Example 5.
Figure 15:
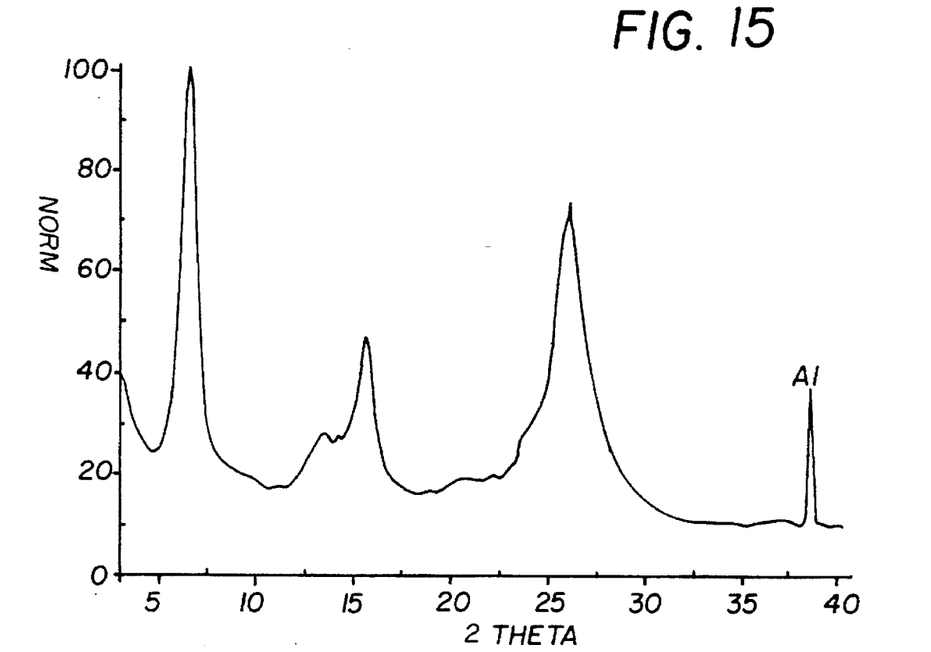
FIG. 15: Comparative Example 6.
Figure 16:
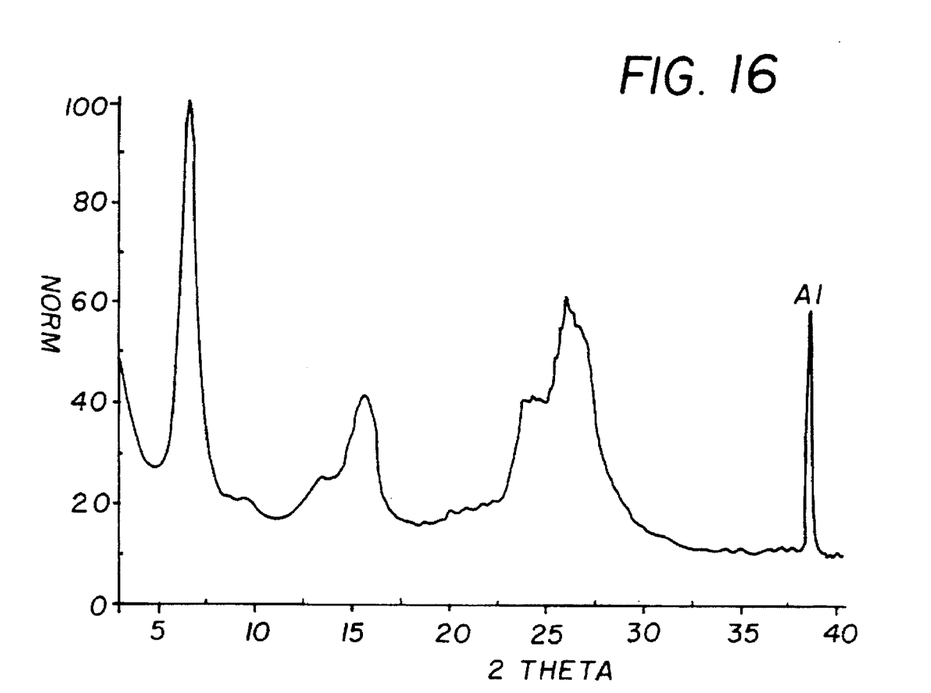
FIG. 16: Comparative Example 7.
Figure 17:
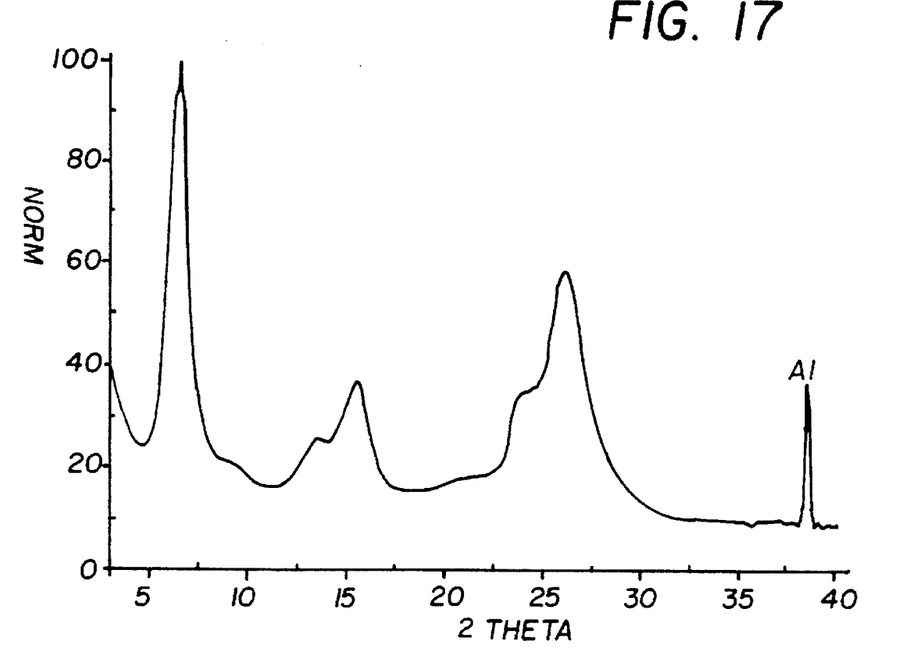
FIG. 17: Comparative Example 8.
Figure 18:
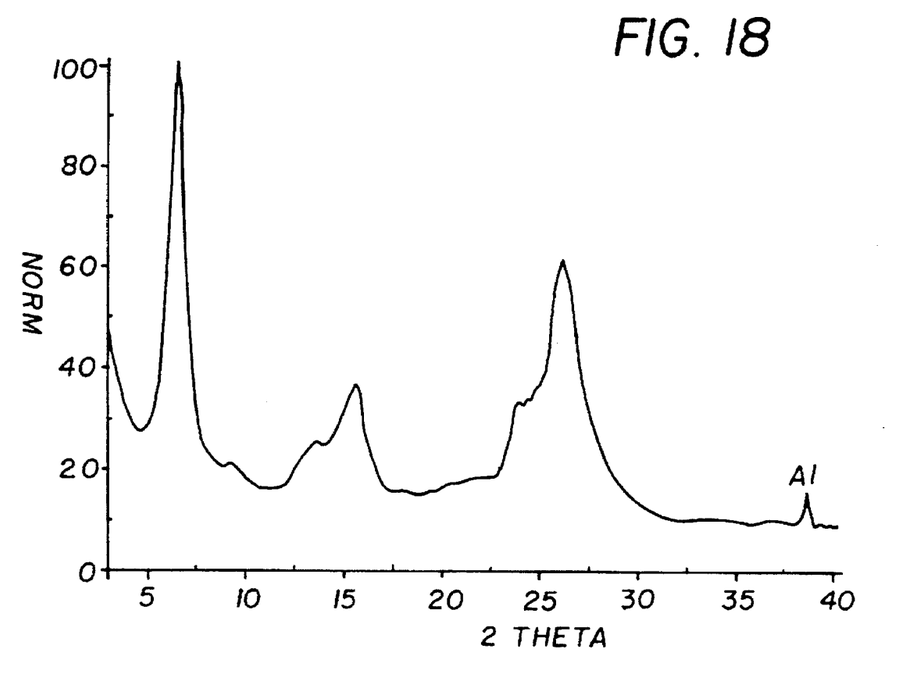
FIG. 18: Comparative Example 9.

Crude titanyl fluorophthalocyanine was dissolved in concentrated sulfuric acid (10 liters) over 2 hours. The temperature of the solution was maintained at about 20° C. The solution was filtered through a coarse sintered glass funnel, precipitated rapidly (50 minutes) into water kept between 6°–32° C. The pigment was allowed to settle and the water was decanted, then the pigment was again dispersed in water. This was repeated for a total of 15 times. The pH of the final wash water was 2. The pigment was dispersed in water, dichloromethane (DCM) was added, the dichloromethane was distilled off, and the water was decanted. This was repeated until a pH neutral filtrate was obtained. The pigment was then redispersed in DCM and filtered through a fine sintered glass funnel, washed with DCM, then with acetone and dried. An X-ray diffraction pattern of the resultant high crystallinity titanyl fluorophthalocyanine powder is presented in FIG. 9.

The sample of the pigment was titrated for residual acid and was found to be substantially free of acid (less than 0.05 weight/weight percent). Results are summarized in Tables 6–7.

TABLE 6

Preparation of highly crystalline titanyl fluorophthalocyanine pigments

| Ex or Comp. Ex | Preparation (after dissolving crude pigment in acid) | Conditions | Speed (erg/cm$^2$) | Dark decay (v/sec) |
|---|---|---|---|---|
| Comp. Ex 4 | precipitated (<50° C.), washed with water (<50° C.) until pH 2, dried, washed with boiling water, re-dried, milled in DCM for 3 days | above 80° C. dried low gamma$_c$ | 2.0 | 12.9 |
| Ex 5 | precipitated (<50° C.), washed with water (<50° C.) until pH 2, washed with DCM/H$_2$O until neutral, washed with DCM, washed with acetone | below 50° C. wet low gamma$_c$ | 1.8 | 2.9 |

"Conditions" indicates the maximum temperature encountered by the pigment, while in the amorphous form; whether the amorphous pigment was wet or dry when treated with organic solvent; and whether the gamma$_c$ of a treating organic solvent was "high" (greater than 9) or "low" (less than 7).

TABLE 7

X-ray diffraction spectra of highly crystalline titanyl fluorophthalocyanine pigments

| Ex or Comp. Ex | Relative peak heights (largest = 100) at Bragg angle 2θ (in degrees ± 0.2 degrees)* | | | | | |
|---|---|---|---|---|---|---|
| 2θ | 7.2 | 11.8 | 15.9 | 23.2 | 24.5 | 27.1 |
| Comp. Ex 4 | 35 | 12 | 24 | 14 | 14 | 100 |
| Ex 5 | 44 | 9  | 24 | 5  | 10 | 100 |

*Peaks having a normalized value of less than about 5 are not listed.

EXAMPLES 6–9

Amorphous titanyl fluorophthalocyanine was prepared substantially as described in Example 1, with the exceptions that the temperatures of the water used to precipitate the dissolved pigment and the water used to wash the amorphous pigment were varied as indicated in Table 8. Resulting pigments were dried at room temperature and powder x-ray diffraction spectra were taken. Results are summarized in Tables 5–9.

COMPARATIVE EXAMPLES 2–9

Amorphous titanyl fluorophthalocyanine was prepared and evaluated as in Examples 6–9, with the exceptions that the temperatures of the water used to precipitate the dissolved pigment and the water used to wash the amorphous pigment were varied as indicated in Table 8. Resulting pigments were dried at room temperature and powder x-ray diffraction spectra were taken. Results are summarized in Tables 8–9.

TABLE 8

Preparation of amorphous titanyl fluorophthalocyanine pigments

| Example or Comparative Example | Precipitation temperature (°C.) | Wash temperature (°C.) |
|---|---|---|
| Ex 6 | 0 | 0 |
| Ex 7 | 0 | 50 |
| Ex 8 | 40 | 0 |
| Ex 9 | 40 | 50 |
| Comp. Ex 5 | 0 | 100 |
| Comp. Ex 6 | 40 | 100 |
| Comp. Ex 7 | 80 | 0 |
| Comp. Ex 8 | 80 | 50 |
| Comp. Ex 9 | 80 | 100 |

TABLE 9

X-ray diffraction spectra of amorphous titanyl fluorophthalocyanine pigments

| Ex or Comp. Ex | Relative peak heights (largest = 100) at Bragg angle 2θ (in degrees ± 0.2 degrees)* | | | | | |
|---|---|---|---|---|---|---|
| 2θ | 6.6° | 9.3° | 13.4 | 15.8° | 23.9° | 26.1° |
| Ex 6 | 100 | — | 6 | 17 | — | 53 |
| Ex 7 | 100 | — | 6 | 15 | — | 53*[1] |
| Ex 8 | 100 | — | 12 | 22 | — | 75 |
| Ex 9 | 100 | — | 9 | 23 | — | 59 |
| Comp. Ex 5 | 100 | — | 11*[2] | 22 | 10 | 50 |
| Comp. Ex 6 | 100 | — | 7.5 | 32 | 3.5*[2] | 50 |
| Comp. Ex 7 | 100 | 3 | 6 | 27*[2] | 31 | 57.5 |
| Comp. Ex 8 | 100 | 2 | 8 | 20*[2] | 17 | 42 |
| Comp. Ex 9 | 100 | 2 | 6 | 21*[3] | 18 | 45 |

*Peaks having a normalized value of less than 2 are not listed.
*[1]Peak at 26.8°.
*[2]Peak ± 0.3°.
*[3]Peak at 15.3°.

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto:

What is claimed is:

1. A method for preparing a high crystallinity titanyl fluorophthalocyanine, said method comprising the steps of
   dissolving titanyl fluorophthalocyanine in acid to form a solution;
   admixing said solution and water, said admixing resulting in precipitation of amorphous titanyl fluorophthalocyanine;
   washing said amorphous titanyl fluorophthalocyanine until substantially all of said acid is removed;
   contacting said amorphous titanyl fluorophthalocyanine with an organic solvent, said contacting resulting in conversion of said amorphous titanyl fluorophthalocyanine to high crystallinity titanyl fluorophthalocyanine; and
   retaining said amorphous titanyl fluorophthalocyanine in contact with water, continuously from said precipitation to said conversion.

2. The method of claim 1 wherein said retaining step is further characterized as retaining said amorphous titanyl fluorophthalocyanine in contact with water and at a temperature of less than about 80° C. continuously from said precipitation to said conversion.

3. The method of claim 1 wherein said retaining step is further characterized as retaining said amorphous titanyl fluorophthalocyanine in contact with water and at a temperature of less than about 50° C. continuously from said precipitation to said conversion.

4. The method of claim 3 further comprising the step of: contacting said amorphous titanyl fluorophthalocyanine with an organic solvent having a gamma$_c$ hydrogen bonding parameter of less than 5.0 to produce a high crystallinity titanyl fluorophthalocyanine.

5. The method of claim 4 wherein said high crystallinity titanyl fluorophthalocyanine has an x-ray diffraction spectrum that exhibits peaks of the Bragg angle 2θ with respect to X-rays of Cu Kα at a wavelength of 1.541 Å at 7.2, 11.9, 13.4, 15.8, 23.4, 24.5, and 27.1° (all ±0.2°).

6. The method of claim 3 further comprising the step of: contacting said amorphous titanyl fluorophthalocyanine with an organic solvent having a gamma$_c$ hydrogen bonding parameter of greater than 9.0 to produce a high crystallinity titanyl phthalocyanine.

7. The method of claim 6 wherein said high crystallinity titanyl fluorophthatocyanine has an x-ray diffraction spectrum that exhibits peaks of the Bragg angle 2θ with respect to x-rays of Cu Kα at a wavelength of 1.541 Å at 6.6, 9.3, 15.1, 23.7, 25.6, and 27.1° (all ±0.2°).

8. A method for preparing a titanyl fluorophthalocyanine composition of matter, said method comprising the steps of
   dissolving titanyl fluorophthalocyanine in acid to form a solution;
   admixing said solution and water, said admixing resulting in precipitation of amorphous titanyl fluorophthalocyanine;
   washing said amorphous titanyl fluorophthalocyanine until substantially all of said acid is removed; and
   retaining said amorphous titanyl fluorophthalocyanine at a temperature of less than about 80° C. during and subsequent to said admixing.

9. The method of claim 8 wherein said retaining step is further characterized as retaining said amorphous titanyl fluorophthalocyanine at a temperature of less than 50° C. during and subsequent to said admixing.

10. The method of claim 9 further comprising drying said amorphous titanyl fluorophthalocyanine, said dry amorphous titanyl fluorophthalocyanine having an X-ray diffraction spectrum that exhibits peaks of the Bragg angle 2θ with respect to X-rays of Cu Kα at a wavelength of 1.541 Å at 6.6, 13.4, 15.8, and 26.1°; (all ±0.20°).

11. The method of claim 9 further comprising contacting said amorphous titanyl fluorophthalocyanine with an organic solvent, said contacting resulting in conversion of said amorphous titanyl fluorophthalocyanine to high crystallinity titanyl fluorophthalocyanine.

12. A method for preparing a titanyl fluorophthalocyanine composition comprising the steps of:
   dissolving titanyl fluorophthalocyanine in an acidic solvent to form a solution;
   admixing said solution and water to precipitate said dissolved titanyl fluorophthalocyanine as amorphous titanyl fluorophthalocyanine;
   washing said amorphous titanyl fluorophthalocyanine, to remove residual acid, until pH neutrality is substantially reached;
   contacting said amorphous titanyl fluorophthalocyanine with an organic solvent to convert said amorphous titanyl fluorophthalocyanine to highly crystalline titanyl fluorophthalocyanine; and retaining said amorphous titanyl fluorophthalocyanine both wet and at a temperature below 50° C. during and after said admixing.

13. The method of claim 12 wherein said second admixing step further comprises:

contacting said amorphous titanyl fluorophthalocyanine with an organic solvent having a gamma$_c$ hydrogen bonding parameter of less than 5.0.

14. The method of claim 1 wherein the washing step is carried out with a mixture of organic solvent and water.

15. The method of claim 8 wherein the washing step is carried out with a mixture of organic solvent and water.

16. A titanyl fluorophthalocyanine having the structure:

where each of k, l, m, and n is independently an integer from 0 to 4 and at least one of k, l, m, and n is an integer from 1 to 4; said titanyl fluorophthalocyanine having an X-ray diffraction spectrum that exhibits peaks of the Bragg angle 2θ with respect to X-rays of Cu Kα at a wavelength of 1.541 Å at 6.6, 13.4, 15.8, and 26.1°; (all ±0.2°).

17. A titanyl fluorophthalocyanine having the structure:

where each of k, l, m, and n is independently an integer from 0 to 4 and at least one of k, l, m, and n is an integer from 1 to 4; said titanyl fluorophthalocyanine having an X-ray diffraction spectrum that exhibits peaks of the Bragg angle 2θ with respect to X-rays of Cu Kα at a wavelength of 1.541 Å at 7.2, 11.9, 13.4, 15.8, 23.4, 24.5, and 27.1° (all ±0.2°).

18. The titanyl fluorophthalocyanine of claim 17 that is, more specifically, titanyl 2,9,16,23-tetrafluorophthalocyanine.

19. A titanyl fluorophthalocyanine having the structure:

where each of k, l, m, and n is independently an integer from 0 to 4 and at least one of k, l, m, and n is an integer from 1 to 4; said titanyl fluorophthalocyanine having an X-ray diffraction spectrum that exhibits peaks of the Bragg angle 2θ with respect to X-rays of Cu Kα at a wavelength of 1,541 Å at 6.6, 9.3, 15.1, 23.7, 25.6, and 27.1° (all ±0.2°).

20. The titanyl fluorophthalocyanine of claim 19 that is, more specifically, titanyl 2,9,16,23-tetrafluorophthalocyanine.

* * * * *